July 14, 1931.  W. H. BRAGAW ET AL  1,813,903
POWER MULTIPLIER
Filed Aug. 6, 1930

Inventor
G. W. Bledsoe,
W. H. Bragaw,

By Clarence A. O'Brien
Attorney

Patented July 14, 1931

1,813,903

UNITED STATES PATENT OFFICE

WILLIAM H. BRAGAW AND GEORGE W. BLEDSOE, OF SILVER CITY, NEW MEXICO

POWER MULTIPLIER

Application filed August 6, 1930. Serial No. 473,492.

This invention relates generally to mechanical power multipliers and particularly to a device of this kind which comprises a wheel or rotatable member for communicating power to a pump, pump jack, walking beam, wind mill or any similar machine or machinery, to multiply the power drive thereof.

It is an object of this invention to provide a power wheel of the type described, which has the advantages of extreme simplicity, having few gears, which is adaptable to be constructed in large or small sizes, and is inexpensive and easy to manufacture.

It is also an object of this invention to provide a wheel of this kind, which requires very little attention, which requires very little lubrication, which is capable of giving two or more power strokes to its associated machine or machinery to each revolution of the wheel.

It is also an object of the invention to provide a wheel power multiplier of the type described which is adaptable to be used or to be driven by any power whatsoever, and which is adaptable to have a driven member composed of cogs, or worm gears, or it may be driven or have power communicated by any suitable means as required.

These and other objects, the nature of the invention, its composition, and its arrangement and combination of parts, will be clearly understood by anyone familiar with the art to which this invention relates by referring to the descriptions below of the accompanying drawings, in which:—

It is to be understood that we do not limit the application of this invention to the particular embodiment set forth herein as an illustration of our invention, and any change or changes may be made in material or structure consistent with the spirit and scope of the invention.

Figure 1:
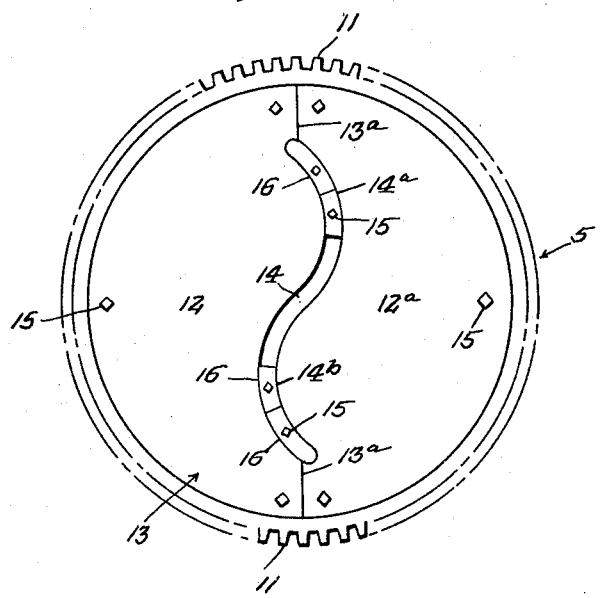
Figure 1 is a side view or front view showing the operative elements of our improved power wheel multiplier.
Figure 2:
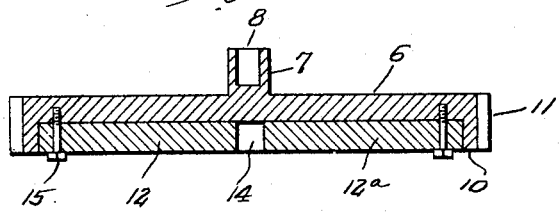
Figure 2 is a horizontal transverse section of Figure 1 approximately on its horizontal diameter.

Referring in detail to the drawings, it will be noted that we designate our power multiplier generally by the numeral 5 and that it is composed of a wheel 6 having a central projection 7 forming a socket 8 in which socket a shaft may be journaled and keyed. Projecting from the other side of the wheel 6 and the perimeter thereof are flanges 10 carrying the cogs or teeth 11 around the circumference of the wheel. The flanges 10 and the wheel 6 form a circular recess for the reception of two or more halves 12 and 12a of a split wheel 13. As shown in Figure 1 the split wheel 13 is split along a diameter as 13a, and a symmetrical curved slot 14 is disposed to have its ends terminate beyond the said diameter. The form of each curve is generally that of an S. The curved portions 14a and 14b are arcs of a circle, and the slot is terminated at each end by the companion abutting plate at each end and the end of the slot cut out to form rounded ends. The pieces 12 and 12a are bolted in the recess by means of bolts 15 in said abutting relation. Adapted to be disposed in the slot 14 are blocks 16 which are bolted therein in order to limit the stroke of the connecting rod or the like which is pivoted at one end in the slot 14 for connecting said wheel to a machine for operating the same. The blocks 16 may be of different lengths, or a different number of the blocks may be employed according to the length of the stroke of said connecting rod which is desired to be limited. The bolt 15 may be bolted in or bolted through the wheel 6 as desired.

It will be obvious that casting the wheel 6 in one piece may render the construction of our improved wheel very inexpensive, but any desired construction may be used at the option of the maker. The halves of the wheel 13 may likewise be cast in one piece and thus effect considerable saving. The bolts 15 may also be economically contributed to the inexpensiveness of the device by being provided all of the same size.

The operation of the wheel is believed obvious in that at a revolution of the wheel a properly connected rod or the like having a driven connection in the slot 14 will be given two impulses for each revolution of the wheel 5, since the connection of said connecting rod will ride in the slot 14 in power application position until it reaches the half point of a curve and at which point it will drop to the end of the slot and receive its second impulse during the latter half of the revolution of the wheel.

It is obvious that any number of such arrangements may be made, and that the number of slots and elements of the wheel may be made in different numbers and in different association, without departing from the spirit of the invention.

It is obvious that we have provided a device of this character which is extremely simple, having few gears, which is adaptable to different pieces and types of machinery, which requires very little attention and very little lubrication, and which is admirably adapted for the purpose for which it is designed.

What is claimed is:—

1. A power multiplier wheel comprising a wheel having a mounting for a shaft projecting from one side thereof, and driving means at its periphery, and plates attached to the side of the wheel opposite the shaft mounting, said plates formed to define a diametrically disposed double curved slot for reception of a connecting rod pin, a connecting rod adapted to be driven by said slot and bearing at its outer end said pin, and blocks mounted in said slot to limit the outward movement of said connecting rod pin.

2. A power multiplier wheel comprising a solid wheel, a central axial axle receiving socket on one side thereof, and laterally directed flanges projecting on the opposite side thereof at the periphery of the wheel, and a plurality of plates having circular outer ends, to enable them to be disposed within the recess formed by said flanges on one side of the wheel, bolts securing said plates in said recess, and said plates having their inner abutting edges cut away to form a plurality of curves centrally registering, said cutting away on said curves forming parallel walled slots between adjacent opposing inner edges of said plates, and said curved slots constituting progressive driving surfaces, a connecting rod having a driving pin at its end, said driving pin adapted to register in said slot and slide therein, said slot formed to impress a plurality of power impulses upon said connecting rod during a single revolution of said wheel.

In testimony whereof we affix our signatures.

WILLIAM H. BRAGAW
GEORGE W. BLEDSOE.